United States Patent
Stavely

(10) Patent No.: US 7,227,573 B2
(45) Date of Patent: Jun. 5, 2007

(54) APPARATUS AND METHOD FOR IMPROVED-RESOLUTION DIGITAL ZOOM IN AN ELECTRONIC IMAGING DEVICE

(75) Inventor: Donald J. Stavely, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 807 days.

(21) Appl. No.: 10/208,529

(22) Filed: Jul. 29, 2002

(65) Prior Publication Data

US 2004/0017492 A1 Jan. 29, 2004

(51) Int. Cl.
*H04N 5/262* (2006.01)
*H04N 5/235* (2006.01)

(52) U.S. Cl. .................. 348/240.2; 348/222.1
(58) Field of Classification Search .......... None
See application file for complete search history.

(56) References Cited

U.S. PATENT DOCUMENTS

| | | | | |
|---|---|---|---|---|
| 4,554,585 | A | * | 11/1985 | Carlson ............... 348/342 |
| 5,359,363 | A | | 10/1994 | Kuban et al. |
| 5,489,940 | A | | 2/1996 | Richardson et al. |
| 5,739,852 | A | | 4/1998 | Richardson et al. |
| 5,751,863 | A | | 5/1998 | Farr |
| 5,796,095 | A | * | 8/1998 | Matsuyama et al. ..... 250/208.1 |
| 6,243,131 | B1 | | 6/2001 | Martin |
| 6,538,691 | B1 | * | 3/2003 | Macy et al. ............ 348/222.1 |
| 6,563,535 | B1 | * | 5/2003 | Anderson .............. 348/231.2 |
| 6,801,252 | B1 | * | 10/2004 | Kawada et al. .......... 348/240.2 |
| 6,873,358 | B1 | * | 3/2005 | Shimizu ............... 348/240.99 |
| 6,937,282 | B1 | * | 8/2005 | Some et al. ............. 348/335 |
| 6,947,082 | B2 | * | 9/2005 | Gomi .................... 348/240.2 |
| 7,009,645 | B1 | * | 3/2006 | Sandini et al. ............ 348/275 |
| 2004/0201768 | A1 | * | 10/2004 | Cahill et al. ............ 348/335 |

FOREIGN PATENT DOCUMENTS

| | | | |
|---|---|---|---|
| EP | 0786814 A1 | | 7/1997 |
| EP | 0786815 A1 | | 7/1997 |
| JP | 01-094776 | * | 4/1989 |
| JP | 06 197288 | | 7/1994 |
| JP | 11 252431 | | 9/1999 |
| JP | 2002 040145 | | 2/2002 |

OTHER PUBLICATIONS

Keiichi Ishida and Shiro Kato. European Patent Office, Patent Abstracts of Japan, Publication No. 01094776, Publication Date Apr. 13, 1989. Application No. 62252905, Application Date Oct. 7, 1987.
Search Report—France, dated Apr. 8, 2005.

* cited by examiner

*Primary Examiner*—Ngoc-Yen Vu
*Assistant Examiner*—Hung H. Lam

(57) ABSTRACT

An electronic imaging device produces higher quality digitally zoomed images than can be obtained by simple cropping and resealing. An array of imaging sensors that places more resolution near the center of the image than at the edges combined with geometrical distortion correction achieves the increase in image quality.

18 Claims, 7 Drawing Sheets

APPARATUS AND METHOD FOR IMPROVED-RESOLUTION DIGITAL ZOOM IN AN ELECTRONIC IMAGING DEVICE

FIELD OF THE INVENTION

The present invention relates generally to electronic imaging devices and more specifically to apparatuses and methods for providing an improved-resolution digital zoom capability in an electronic imaging device such as a digital camera or digital video camera.

BACKGROUND OF THE INVENTION

Electronic imaging devices such as digital cameras or digital video cameras often include a zoom feature. This feature may be provided optically, through the use of a zoom lens, or by cropping (and possibly rescaling) the digital image. The latter method is often referred to as "digital zoom."

Though simple and inexpensive to implement, digital zoom has a major disadvantage: loss of resolution upon rescaling to a larger image size. A digital image may be scaled to a larger image size by using the existing pixel information to estimate the added pixels. The simplest method replicates the value of the nearest neighbor pixel. More sophisticated techniques use interpolation to generate an intermediate pixel value from several neighboring pixels. Bilinear and bicubic interpolation are examples of these techniques. Every rescaling method, particularly pixel replication, produces an image that suffers in quality at high zoom factors, even if the electronic imaging device has reasonably high resolution. Providing the electronic imaging device with even higher resolution to compensate for digital zoom adds to the cost of the device. Although an optical zoom lens avoids the major disadvantage of digital zoom, an optical zoom lens may add bulk, weight, and cost to the electronic imaging device.

It is thus apparent that there is a need in the art for an improved-resolution digital zoom capability in an electronic imaging device.

SUMMARY OF THE INVENTION

An electronic imaging device having an improved-resolution digital zoom capability is provided. An associated method for providing an improved-resolution digital zoom capability in an electronic imaging device is also provided.

Other aspects and advantages of the present invention will become apparent from the following detailed description, taken in conjunction with the accompanying drawings, illustrating by way of example the principles of the invention.

DETAILED DESCRIPTION OF THE INVENTION

The quality of the image obtained from digital zoom may be improved by digitizing an optical image using an array of imaging sensors ("sensor array") having a non-uniform pixel layout in which the size of the imaging sensors increases from the center of the array to its perimeter and in which the pitch (inversely proportional to the picture element spacing) of the imaging sensors decreases from the center of the array to its perimeter. Throughout this description, the "resolution" of a digital image refers to the number of picture elements (pixels) per linear unit of measurement of the target optical image from which it is generated. A non-uniform sensor array such as that just described produces a distorted digital image having higher resolution near the center than at the edges. Therefore, that central region of the distorted image may be cropped and resealed with less loss of quality than would result with a conventional (undistorted) image created using an array of uniformly distributed imaging sensors having the same total number of pixels. Further, the geometric distortion in the image caused by the non-uniform imaging sensor array may be corrected using mathematical techniques well known in the image processing art. The correction may be performed either before or after cropping.

Figure 1A:
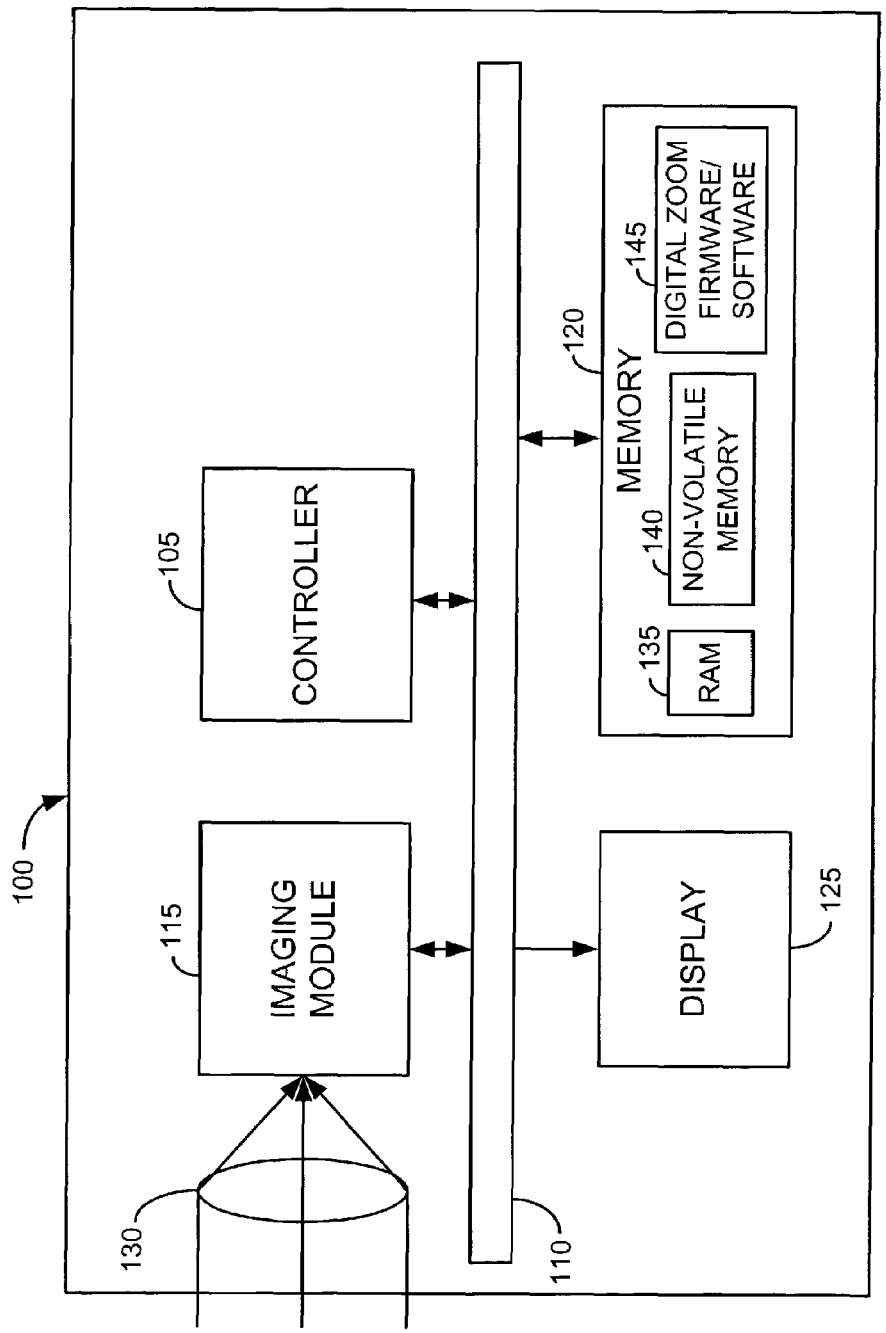
FIGS. 1A and 1B are functional block diagrams of an electronic imaging device in accordance with an illustrative embodiment of the invention.
Figure 1B:
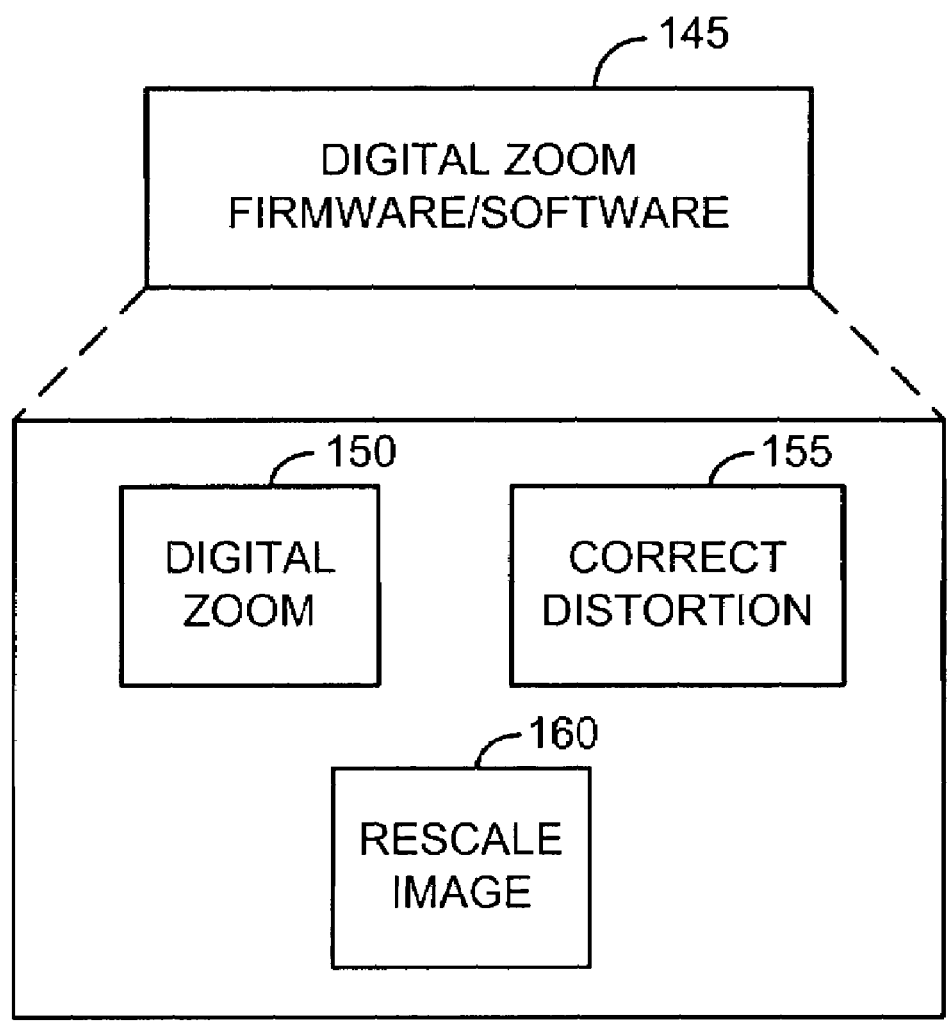

FIGS. 1A and 1B are functional block diagrams of an electronic imaging device 100 in accordance with an illustrative embodiment of the invention. Electronic imaging device 100 may be a digital camera, digital video camera, or any other electronic imaging device that digitizes optical images. In FIG. 1A, controller 105 communicates over data bus 110 with imaging module 115, memory 120, and display 125. Optical system 130 produces optical images that are converted to digital images by imaging module 115. In a typical implementation, optical system 130 may comprise, for example, a lens, more than one lens, or a combination of one or more lenses with one or more mirrors. Imaging module 115, in a typical implementation, may comprise an array of photosensors based on charge-coupled-device (CCD) or CMOS technology arranged in a non-uniform pixel layout, an analog-to-digital converter (A/D), a gain control, and a digital signal processor (DSP) (not shown in FIG. 1A). The nature of the non-uniform pixel layout of the array of imaging sensors associated with imaging module 115 will be explained more fully in connection with FIGS. 2A and 2B. Memory 120 further comprises random access memory (RAM) 135, non-volatile memory 140, and digital zoom firmware/software 145. Referring to FIG. 11B, Digital zoom firmware/software 145 may include modules "Digital Zoom" 150, "Correct Distortion" 155, and "Rescale Image" 160. Module Digital Zoom 150 crops a digital image within a central portion of the image having relatively higher resolution than an edge portion in accordance with a desired digital zoom factor. Module Correct Distortion 155 corrects for the distortion introduced by the non-uniform sensor layout of imaging module 115. Distortion correction will be explained further in a subsequent portion of this description. Module Rescale Image 160 enlarges a cropped image either by replicating pixels or, preferably, by interpolation. Pixel replication and interpolation techniques are well known in the digital image processing art. Module Rescale Image 160 may, for example, be used to provide a user of electronic imaging device 100 with a preview of a digitally zoomed scene before a final image is captured. Rescaling may also be employed as a post-processing step in some applications. For example, a user may rescale a zoomed digital image to a larger size before printing the image. The functional boundaries characterizing Modules Digital Zoom 150, Correct Distortion 155, and Rescale Image 160 are purely conceptual. For example, these functions may be implemented as three separate software or firmware modules, as fewer than three software or firmware modules, or in any other fashion that is advantageous, including custom hardware or a combination of hardware and software/firmware.

In a typical implementation, non-volatile memory 140 may be of the removable type, such as a CompactFlash™, Smart Media™, or Secure Digital™ cards. Removable memory is often used for storing digital images that will not fit within the internal memory of electronic imaging device 100.

Figure 2A:
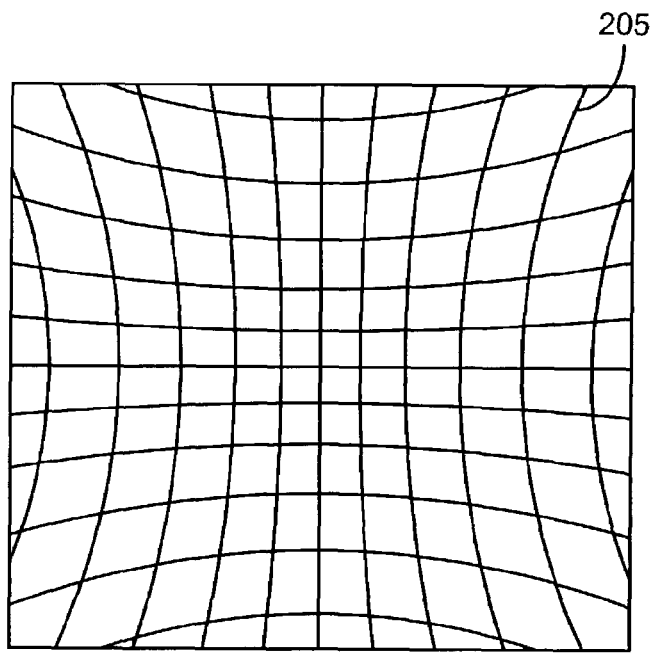
FIG. 2A is an illustration of an array of imaging sensors having a "pin-cushion-distorted" pixel layout in accordance with an illustrative embodiment of the invention.
Figure 2B:
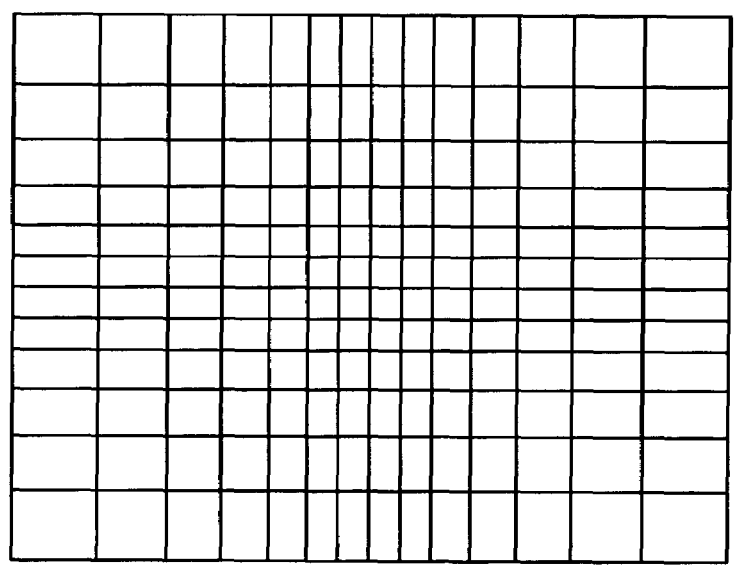
FIG. 2B is an illustration of an array of imaging sensors having a non-uniform rectilinear pixel layout in accordance with another illustrative embodiment of the invention.

FIGS. 2A and 2B illustrate examples of non-regular and/or non-rectilinear pixel layouts for imaging module 115. FIG. 2A is an illustration of an array of imaging sensors having a "pin-cushion-distorted" pixel layout in accordance with an illustrative embodiment of the invention. An image created using such a sensor array, when viewed conventionally (on a rectangular grid), exhibits "barrel" distortion (the opposite geometric distortion of the pixel layout). FIG. 2B is an illustration of an array of imaging sensors having a non-uniform rectilinear pixel layout in accordance with another illustrative embodiment of the invention. The rectilinear arrangement may have the advantage of simplifying the sensor pixel layout of imaging module 115 and the subsequent correction of distortion. In general, any sensor pixel layout that places sufficient resolution near the center of the resulting digital image where it is most needed for digital zooming is satisfactory for the purposes of the invention. The distortion introduced by imaging module 115 may be characterized and corrected using techniques that are well known in the digital image processing art. For example, methods are disclosed in U.S. Pat. No. 5,751,863 to Farr and U.S. Pat. No. 5,359,363 to Kuban et. al. Geometric distortion correction in general, including the correction of both "barrel" and "pin-cushion" distortion, is also explained in William K. Pratt, *Digital Image Processing*, John Wiley & Sons, Inc., New York City, N.Y. 1978, pp. 429–432. One approach called "spatial warping" described in Pratt involves fitting a polynomial curve to each distorted grid line 205 in FIG. 2A in the horizontal and vertical direction and then computing an inverse correction function for each cell defined by the intersecting grid lines.

U.S. Pat. No. 5,796,095 to Matsuyama et. al discloses an imaging sensor array having a central rectangular region of high pitch and a surrounding marginal region of relatively lower pitch. However, Matsuyama et. al, which is directed to an auto-focus apparatus for a digital camera, uses the higher resolution provided by the central portion of the sensor array to improve the performance of auto-focus. Matsuyama et. al does not teach generating a complete digital image using all the sensors in a non-uniform sensor array to produce an improved-resolution digitally zoomed image.

Figure 3:
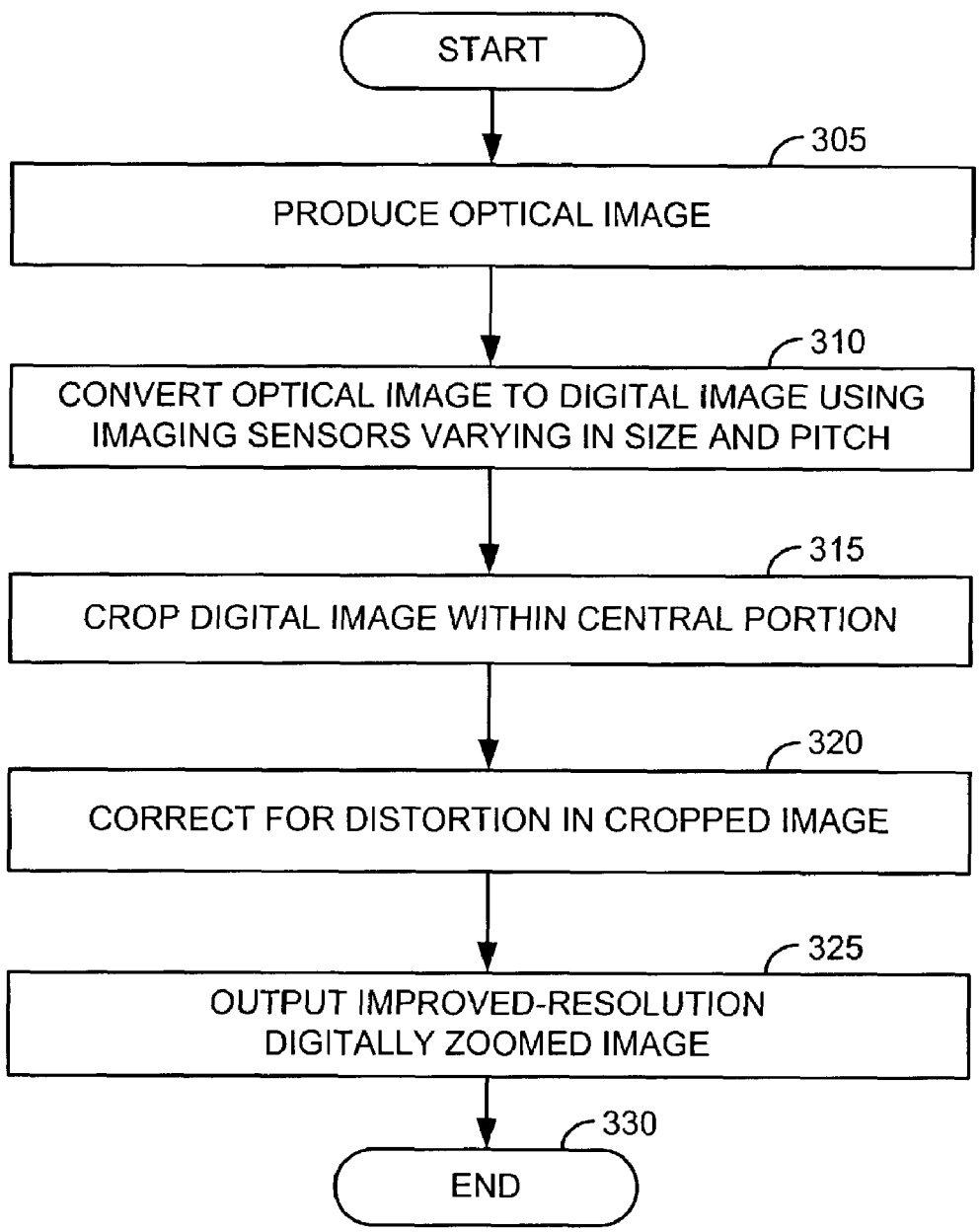
FIG. 3 is a flowchart of a method for providing an improved-resolution digital zoom capability in the electronic imaging device shown in FIGS. 1A and 1B.

FIG. 3 is a flowchart of a method for implementing digital zoom in electronic imaging device 100 in accordance with an illustrative embodiment of the invention. At 305, optical system 130 may be used to produce an optical image. Imaging module 115 may then convert the optical image to a digital image containing intentional, controlled distortion at 310. The digital image produced at 310 has relatively higher resolution near the center than at the edges. At 315, module Digital Zoom 150 may digitally zoom (crop) the digital image within the central portion where the resolution is higher. At 320, module Correct Distortion 155 may correct the distortion in the cropped image caused by imaging module 115. The resulting improved-resolution digitally zoomed image may then be output at 325, and the process terminates at 330. Optionally, module Rescale Image 160 may be invoked to provide a preview before final image capture or to post process the improved-resolution digitally zoomed image.

Figure 4:
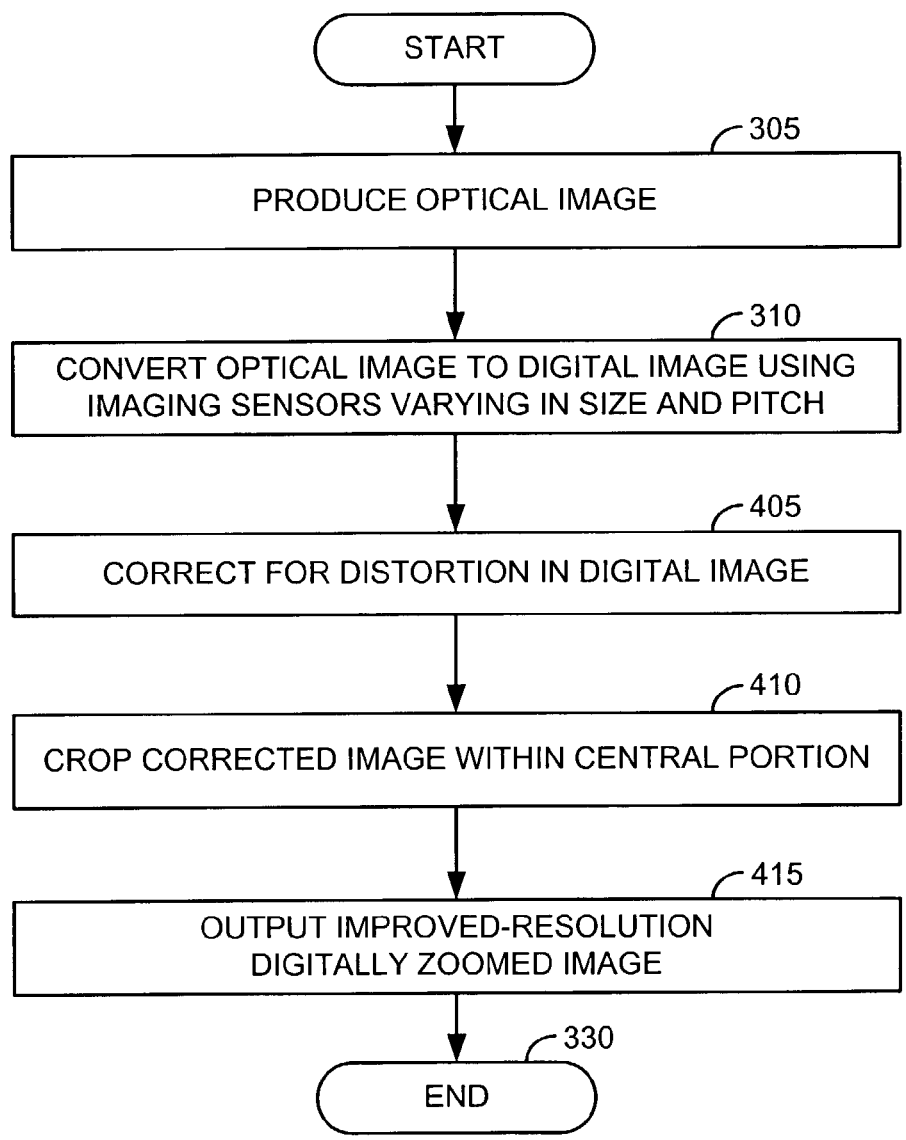
FIG. 4 is a flowchart of another method for providing an improved-resolution digital zoom capability in the electronic imaging device shown in FIGS. 1A and 1B.

FIG. 4 is a flowchart of another method for implementing digital zoom in electronic imaging device 100 in accordance with an illustrative embodiment of the invention. In FIG. 4, steps 305 and 310 are performed as in FIG. 3. However, module Correct Distortion 155 corrects the distortion caused by imaging module 115 at 405 prior to digital zooming (cropping) of the image at 410 by module Digital Zoom 150. An improved-resolution digitally zoomed image may then be output at 415, and the process terminates at 330. Optionally, module Rescale Image 160 may be invoked to provide a preview before final image capture or to post process the improved-resolution digitally zoomed image.

The order of digital zooming (cropping) and geometric distortion correction is not critical and may be implemented as in FIG. 3 or FIG. 4. The implementation shown in FIG. 3 has the advantage, however, that fewer pixels remain to be processed during the distortion correction step.

Figure 5:
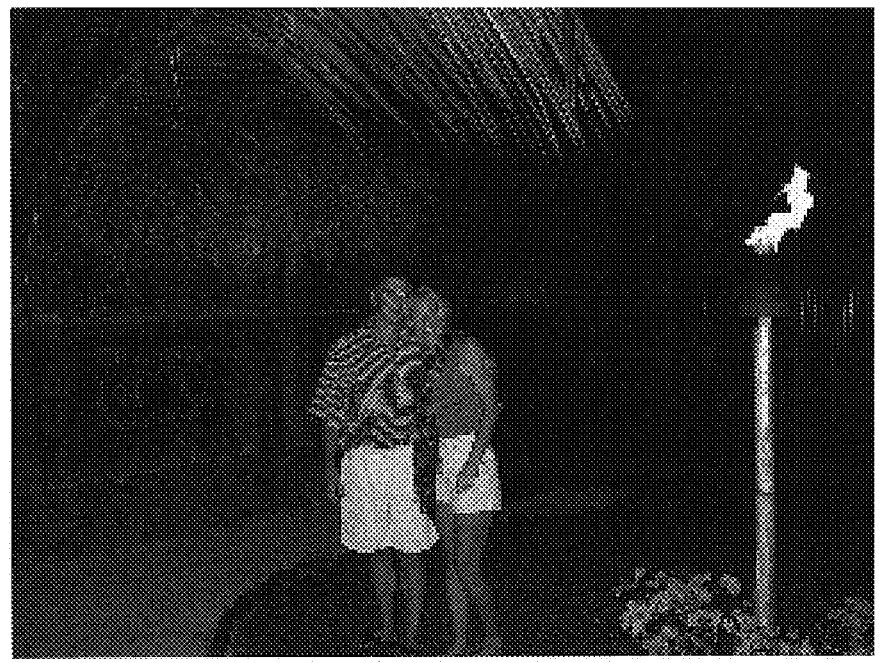
FIG. 5 is an image free of intentional distortion created using an array of imaging sensors having a uniform pixel layout.
Figure 6:
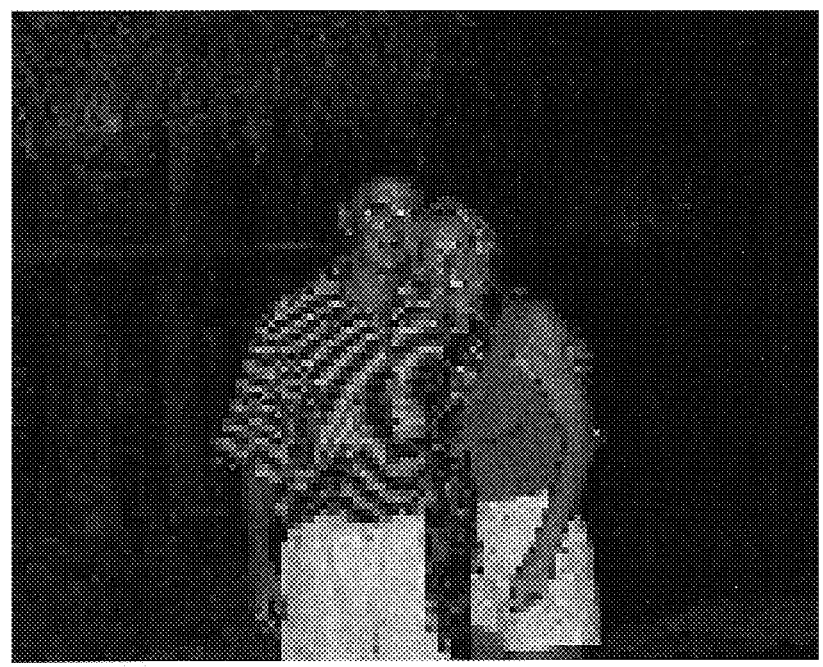
FIG. 6 is a digitally zoomed and rescaled version of the image shown in FIG. 5.
Figure 7:
FIG. 7 is an image containing intentional distortion created using an array of imaging sensors having a non-uniform pixel layout in accordance with an illustrative embodiment of the invention.
Figure 8:
FIG. 8 is an improved-resolution digitally zoomed and rescaled image generated from the image shown in FIG. 7 in accordance with an illustrative embodiment of the invention.

FIGS. 5–8 are images showing the operation of the invention and demonstrating its advantages over conventional digital zoom implementations. (Note that very low resolution images are used in FIGS. 5–8 for purposes of illustration. Typical imaging systems produce images with millions of pixels.) FIG. 5 is a reference digital image free of intentional distortion captured using a conventional array of imaging sensors having a uniform pixel layout. When the image in FIG. 5 is cropped (digitally zoomed) and rescaled to the original size, noticeable degradation of image quality occurs, as shown in FIG. 6. FIG. 7 is a digital image of the same scene as in FIG. 5 captured with the same total number of pixels as in FIG. 5 using a sensor array having a "pin-cushion" pixel layout similar to that shown in FIG. 2A in accordance with an illustrative embodiment of the invention. Due to the distorted pixel layout, the image in FIG. 7 contains a high degree of "barrel" distortion. FIG. 8 is the image in FIG. 7 after cropping (digital zooming), distortion correction, and resealing to the original size in accordance with an illustrative embodiment of the invention. FIG. 8 is of noticeably higher quality than FIG. 6.

The non-uniform pixel layout of imaging module 115 provides an additional advantage: since the photosensors near the edges of the sensor array are greater in area than those near the center, they have greater light-gathering power than those near the center. This arrangement compensates for lens vignetting (relatively lower illumination in an optical image near its edges than near its center) and may, therefore, allow the vignetting specification of the lens to be relaxed. A relaxed vignetting specification allows the lens to be both smaller and less expensive.

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An electronic imaging device having an improved-resolution digital zoom capability, comprising:
    an optical system to produce an optical image;
    an array of imaging sensors to convert the optical image to a digital image, the imaging sensors varying in size and pitch, the size increasing from the center of the array to the perimeter of the array, the imaging sensors thereby introducing geometric distortion in the digital image, a central portion of the digital image thereby acquiring relatively higher resolution than an edge portion of the digital image;
    first logic to extract a cropped digital image from within the central portion; and
    second logic to correct the geometric distortion in the cropped digital image, the electronic imaging device thereby producing an improved-resolution digitally zoomed image.

2. The electronic imaging device of claim 1, further comprising:
    third logic to rescale the improved-resolution digitally zoomed image to a predetermined size.

3. The electronic imaging device of claim 1, wherein the imaging sensors are arranged in a pin-cushion-distorted pixel layout.

4. The electronic imaging device of claim 1, wherein the imaging sensors are arranged in a non-uniform rectilinear pixel layout.

5. The electronic imaging device of claim 1, wherein the electronic imaging device comprises a digital camera.

6. The electronic imaging device of claim 1, wherein the electronic imaging device comprises a digital video camera.

7. An electronic imaging device having an improved-resolution digital zoom capability, comprising:
    means for producing an optical image;
    sensor means for converting the optical image to a digital image, the sensor means introducing geometric distortion in the digital image, a central portion of the digital image thereby acquiring relatively higher resolution than an edge portion of the digital image;
    first logic means for extracting a cropped digital image from within the central portion; and
    second logic means for correcting the geometric distortion in the cropped digital image, the electronic imaging device thereby producing an improved-resolution digitally zoomed image.

8. The electronic imaging device of claim 7, further comprising:
    third logic means for rescaling the improved-resolution digitally zoomed image to a predetermined size.

9. The electronic imaging device of claim 7, wherein the sensor means comprises an array of imaging sensors arranged in a pin-cushion-distorted pixel layout.

10. The electronic imaging device of claim 7, wherein the sensor means comprises an array of imaging sensors arranged in a non-uniform rectilinear pixel layout.

11. The electronic imaging device of claim 7, wherein the electronic imaging device comprises a digital camera.

12. The electronic imaging device of claim 7, wherein the electronic imaging device comprises a digital video camera.

13. A method for providing an improved-resolution digital zoom feature in an electronic imaging device, comprising:
    producing an optical image;
    converting the optical image to a digital image using an array of imaging sensors, the imaging sensors varying in size and pitch, the size increasing from the center of the array to the perimeter of the array, the pitch decreasing from the center of the array to the perimeter of the array, the imaging sensors thereby introducing geometric distortion in the digital image, a central portion of the digital image thereby acquiring relatively higher resolution than an edge portion of the digital image;
    producing a cropped digital image from within the central portion; and
    correcting the geometric distortion in the cropped digital image to produce an improved-resolution digitally zoomed image.

14. The method of claim 13, further comprising:
    rescaling the improved-resolution digitally zoomed image to a predetermined size.

15. The method of claim 13, wherein the imaging sensors are arranged in a pin-cushion-distorted pixel layout.

16. The method of claim 13, wherein the imaging sensors are arranged in a non-uniform rectilinear pixel layout.

17. The method of claim 13, wherein the electronic imaging device comprises a digital camera.

18. The method of claim 13, wherein the electronic imaging device comprises a digital video camera.

* * * * *

UNITED STATES PATENT AND TRADEMARK OFFICE
CERTIFICATE OF CORRECTION

PATENT NO. : 7,227,573 B2  Page 1 of 1
APPLICATION NO. : 10/208529
DATED : June 5, 2007
INVENTOR(S) : Donald J. Stavely It is certified that error appears in the above-identified patent and that said Letters Patent is hereby corrected as shown below:

On the title page, item (57), under "ABSTRACT", in column 2, line 3, delete "resealing" and insert -- rescaling --, therefor.

In column 2, line 67, delete "FIG. 11B," and insert -- FIG. 1B, --, therefor.

In column 5, line 26, in Claim 1, after "array," insert -- the pitch decreasing from the center of the array to the perimeter of the array, --.

Signed and Sealed this

Twelfth Day of May, 2009

JOHN DOLL
*Acting Director of the United States Patent and Trademark Office*